Nov. 27, 1923.
A. W. MacILWAINE
1,475,842
PACKING AND PRESERVATION OF PEANUTS
Filed Aug. 9, 1921
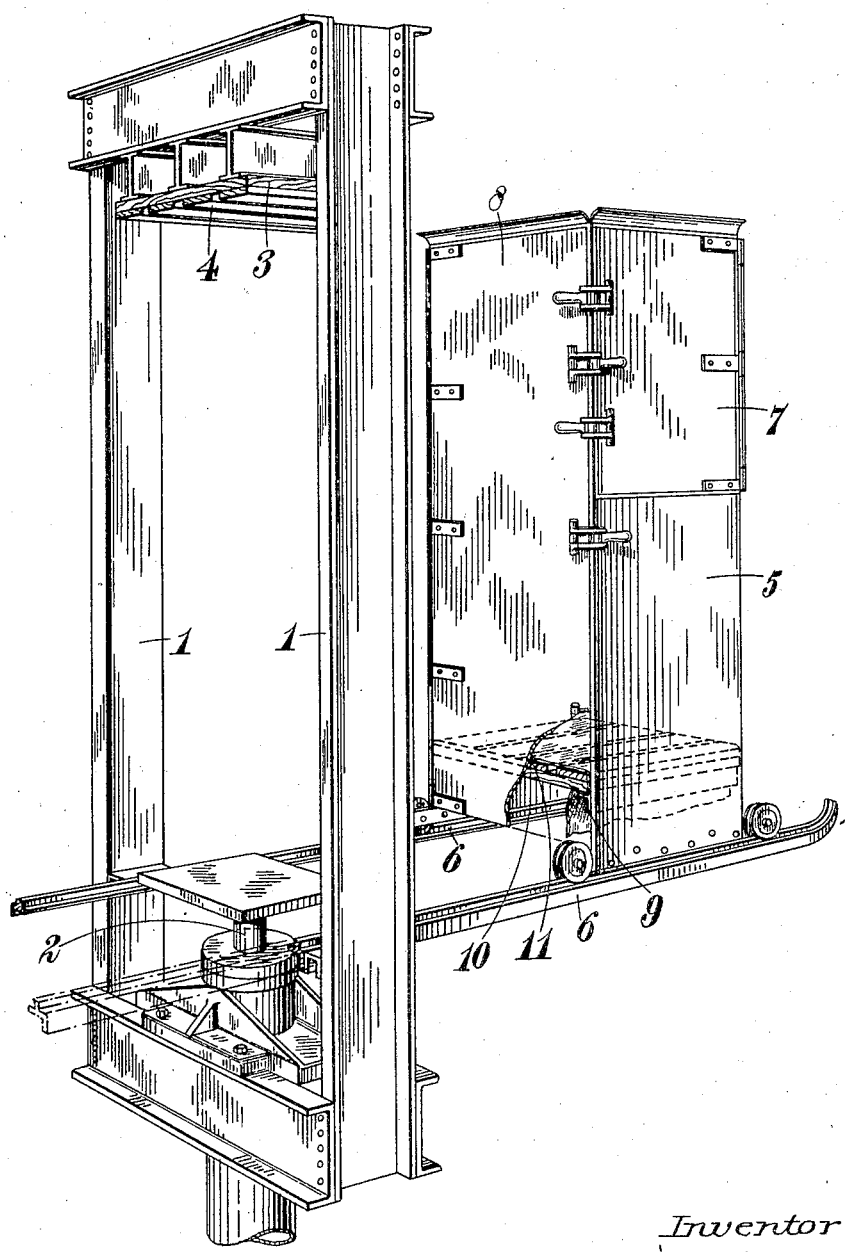
Inventor
Alfred William MacIlwaine, Patented Nov. 27, 1923.

1,475,842

UNITED STATES PATENT OFFICE.

ALFRED WILLIAM MacILWAINE, OF YORKSHIRE, ENGLAND.

PACKING AND PRESERVATION OF PEANUTS.

Application filed August 9, 1921. Serial No. 490,899.

*To all whom it may concern:*

Be it known that I, ALFRED WILLIAM MAC-ILWAINE, subject of the King of England, residing in Yorkshire, England, have invented certain new and useful Improvements in the Packing and Preservation of Peanuts, of which the following is a specification.

This invention relates to improvements in the preservation and/or transportation of the nuts known under various names as peanuts, ground nuts, earth nuts, monkey nuts, or arachis nuts, which have kernels enclosed in loose and pliable, non-splintering shells, the objects being to preserve the nuts from decomposition and to reduce the cost of transport.

The nuts referred to have bulky shells within which the kernels lie loose and it has hitherto been customary with a view to reducing shipping space to decorticate the nuts before packing them into bags. Decortication in the country where the nuts are produced is disadvantageous, as it results during the subsequent transportation or shipment of the kernels, in a deterioration or partial decomposition of the oil which is the most valuable constituent of the nuts. Undecorticated nuts contain a small percentage (in the region of 1% to 2%) of free fatty acid, and the decomposition referred to has the effect of increasing this acid content, thereby lowering the quality of the oil. Furthermore, decortication is liable to cause abrasion of the fine skin which covers the kernels.

According to the present invention nuts of the kind specified are prepared for transport and/or preserved from deterioration by compressing quantities of said nuts in bulk in their shells under a pressure insufficient to express any appreciable quantity of the contained oil, but sufficient to form a package of greatly reduced bulk compared with that occupied by the uncompressed nuts.

In a preferred mode of carrying out the invention the pressure employed is insufficient to express any of the contained oil from the kernels but sufficient to form the nuts into a coherent block, the nuts being compressed to such a degree as substantially to close up the interstitial air spaces without fracture of any considerable proportion of the kernels.

It will be understood that owing to natural variations in the size, shape and quality of the nuts, it may not be possible in all cases to avoid breaking or even bruising some of the kernels. In the case of nuts of fair average quality, however, no difficulty has been found in so conducting the compression that none of the kernels in the compressed block are bruised or oily on the exterior.

In practice it is found practicable and advantageous to compress the nuts to approximately one-half of the bulk which they initially occupied in the press. Conveniently the compression pressure employed is in the region of from one to two hundredweights per square inch on the block.

By compressing the nuts in this way, not only are the shells left upon the nuts to protect them, but access of the atmosphere to the contents of the packages through interstitial spaces is effectively restricted.

The invention also includes as a new product a block or a package of nuts of the kind specified, prepared according to the method above set forth.

One preferred method of carrying this invention into effect will now be described in detail by way of example, reference being made to the accompanying drawing which is a diagram in perspective of one suitable form of press.

The press comprises an upright framework 1 with a hydraulic plunger 2 movable vertically from the bottom upward. At the top of the press frame is a horizontal headplate 3, with transverse wooden slats 4. The compression chamber comprises an upright box 5 movable on rails 6 which run through the press. The box has two fixed sides, rigidly secured at right angles. The lower half of a third side is also rigidly secured, but the upper half 7 is hinged. The fourth vertical wall 8 is hinged to the other fixed side. The top of the box is open, but at the bottom the side walls have inturned flanges 9 on which can be placed a wooden false bottom 10 with transverse wooden slats 11 above it.

In operation, laths (not shown) are first laid on the false bottom transversely to the slats 11, then a sheet of jute or like material is spread over the false bottom and the sides of the sheet hang down. The false bottom 10 is placed in position at the bottom of the box 5, which is then closed and the box is filled with nuts. Another sheet of jute or like material (not shown) is then placed over the top, and laths are laid on this top sheet transversely to the direction of the upper slats 4. The box is then run on the rails into the press, so that the false bottom comes just over the plunger, while the open top comes just under the slats of the head-plate. The plunger 2 is now gently raised (say half-way up the box), the pressure applied being in the region of one to two hundredweights per square inch on the block. While pressure is still maintained, the hinged wall 8 and the hinged half-wall 7 are opened out so as to leave the block exposed on two sides. The whole box 5 is then wheeled away, still leaving the block under pressure between the plunger and head plate. The sheets of jute or like material are folded round the block, and they are subsequently sewn up. Wires, cords, or hooping are passed round the package between the slats and are made fast. The plunger is then lowered and the package removed. The resultant packages are rectangular in shape, and may thus be stowed for transport and shipment without waste of space.

The actual compression pressure employed depends upon the quality and nature of the nuts to be treated, but it is found that in the case of nuts of fair average quality, with a pressure in the region of the limits stated above, the bulk occupied by the nuts in the mould may be reduced by about 50% without any danger of expressing oil.

It is found that blocks prepared according to this invention, contain on arrival in this country from abroad, a percentage of free fatty acid (reckoned upon the oil) only slightly in excess of that present in unpressed and undecorticated nuts, and the actual quantity of acid present is such that it can readily be eliminated by known processes without appreciable waste of the oil.

For the sake of clearness in the following claims, the nuts to which this invention relates will be termed "pea-nuts."

What I claim as my invention and desire to secure by Letters Patent is:—

1. A method of preserving pea-nuts and preparing them for transportation which consists in compressing quantities of said nuts in bulk in their shells under a pressure insufficient to express any appreciable quantity of the contained oil but sufficient to form a package of greatly reduced bulk.

2. A method of preserving pea-nuts and preparing them for transportation, which consists in compressing quantities of said nuts in bulk in their shells under a pressure insufficient to express any of the contained oil from the kernals but sufficient to form the nuts into a coherent block without fracture of any considerable proportion of the kernals.

3. A method of preserving pea-nuts and preparing them for transportation, which consists in compressing quantities of said nuts in bulk in their shells under a pressure in the region of from one to two hundredweights per square inch on the nuts.

4. A method of preserving pea-nuts and preparing them for transportation, which consists in introducing into a press quantities of said nuts in their shells and compressing said nuts until their bulk is reduced to approximately one-half of that initially occupied in the press.

5. As a new product, a coherent block of pea-nuts in which the kernels are whole with the shells collapsed around them.

6. As a new product, a coherent block of pea-nuts in which the kernels are whole and are free from oil on their exterior and in which the shells are collapsed around the kernels.

7. As a new product, a coherent block of pea-nuts in which the shells are collapsed about the kernels, so that they closely fit around the latter, the block being substantially free from interstitial air spaces.

In testimony whereof I affix my signature.

ALFRED WILLIAM MacILWAINE.